United States Patent Office 2,768,616
Patented Oct. 30, 1956

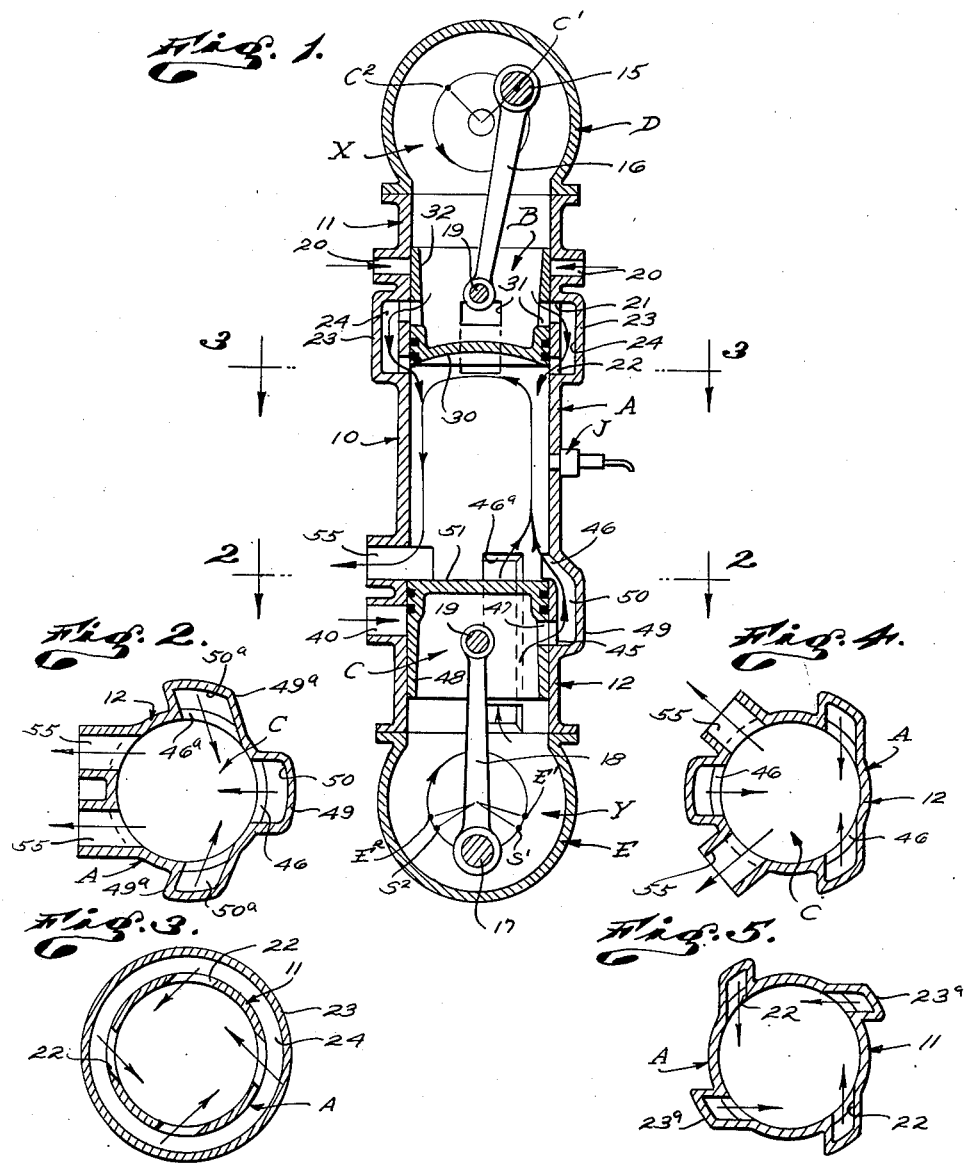

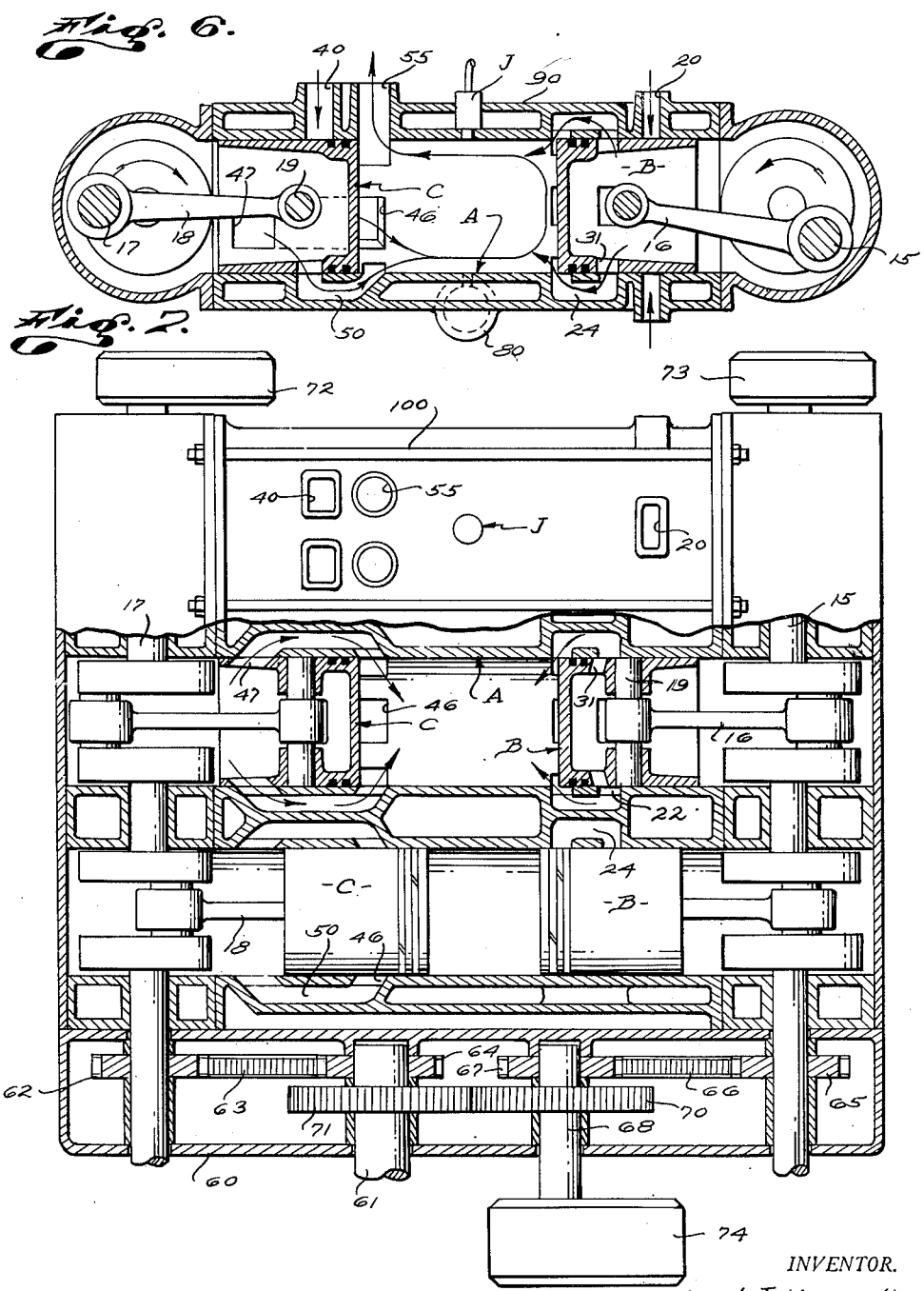

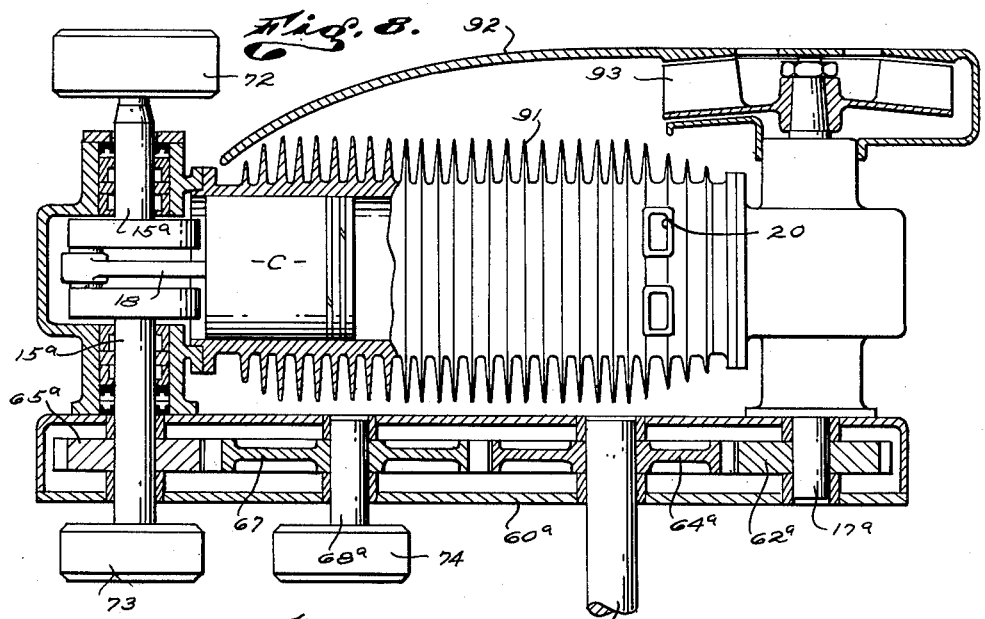
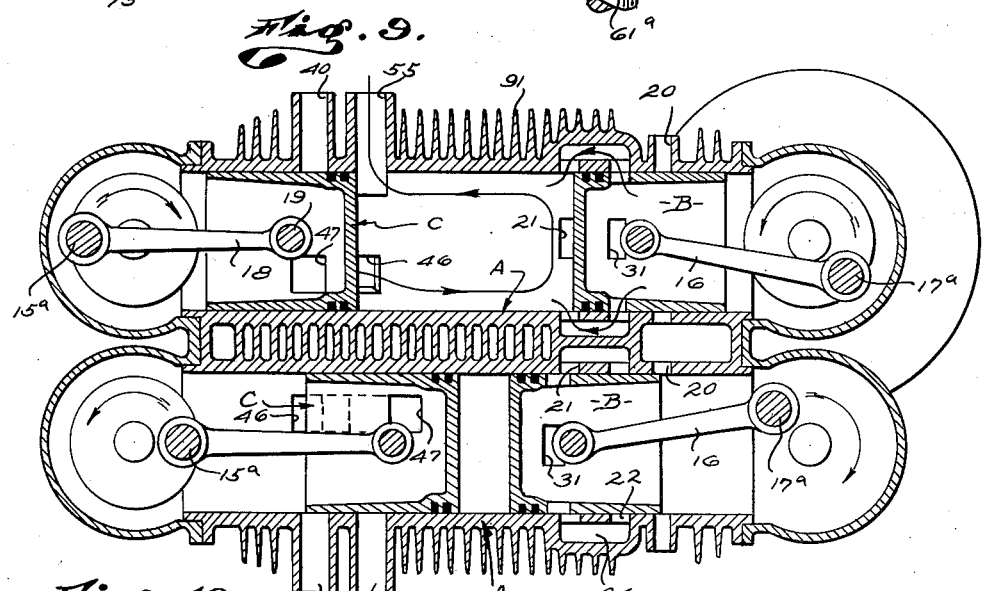
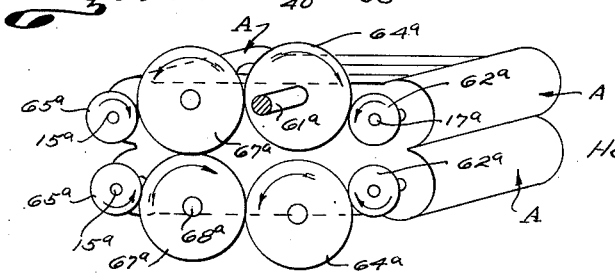

2,768,616

TWO CYCLE OPPOSED PISTON INTERNAL COMBUSTION ENGINE

Herbert J. Venediger, Furth, Germany, assignor of one-half to Thomas B. Danckwortt, Beaumont, Calif.

Application October 25, 1951, Serial No. 253,138

Public Law 619, August 23, 1954
Patent expires December 23, 1968

3 Claims. (Cl. 123—51)

This invention has to do with a two cycle internal combustion engine of a type involving opposed pistons, and it is a general object of the invention to provide a simple, practical, improved engine in which the flow of air or the intake charge as well as the flow of burned gases is controlled by pistons which cooperate with the ports in the cylinder, there being two pistons in the cylinder compressing the charge as the pistons approach each other during the compression cycle and moving apart following ignition of the charge and during the work cycle.

Usual opposed piston two cycle internal combustion engines are commonly characterized by exhaust ports arranged at one end of the cylinder while the inlet ports are at the other end of the cylinder. This general relationship of ports results in the flow of air or inlet gases and of the exhaust gases axially of the cylinder with resulting uniflow action which is desirable.

Engines of the character just referred to can be operated at very high speeds due to desirable mass balance, and it is possible to use or follow an unsymmetrical control diagram by off-setting the relation of the working cranks relative to each other so that the exhaust closes ahead of the intake and there may be super-charging. However, the port arrangements for such uniflow action result in the exhaust gases being controlled by but one of the pistons and this piston is subject to becoming excessively overheated.

The heavy thermal load upon the piston handling the exhaust is due to excessive exposure of that piston to exhaust gases, and in practice makes impossible the utilization of the potential speed capacity of this general type or form of engine. When the crank chamber of the piston controlling the inlet is the only one serving as a case of a scavenging and charging pump, there is a limited amount of scavenging and charging air available and this becomes a limiting factor and materially impairs engine efficiency.

To overcome factors such as I have noted, engines of the type mentioned have been complicated by a separate air charging means which structures become costly, and any mechanisms of this kind added as auxiliaries absorb power and thus cut down over-all engine efficiency.

The present invention provides a construction that gains scavenging of the cylinder in a manner similar to that obtained in a single piston two cycle internal combustion engine. One, the first, piston controls exhaust and intake ports with resulting up and down flowing streams of scavenging air creating counterflow scavenging, that is, scavenging by crossed or looped flow while the other, or second, piston only controls additional scavenging and charging ports which do not participate in scavenging of exhaust gases but serve to effect increasing of the charging of the cylinder with fresh air or with fuel mixture as a gas engine may require.

In accordance with the invention, crank cases adjoin the ends of the cylinder and the pistons cooperate with the crank chambers so that the cases serve as suppliers of scavenging and charging air with the result that the structure as a whole has advantages such as occur in a single piston two cycle internal combustion engine. The output from the two crank cases is sufficient to effect efficient scavenging and charging, even in the case of an engine operating on the diesel principle. The constant cooling of the piston handling the exhaust ports by the fresh air controlled by that piston assures full utilization of the mechanical possibilities inherent in an engine of the general type and form mentioned.

In carrying out the invention, it is advantageous that the combined total stroke of the two pistons be of such extent that the scavenging streams controlled by the exhaust piston and going back and forth in the cylinder just about maintain the looped type stream in the cylinder between the pistons at the desired speed of operation of the engine; that is, the scavenging stream from the piston controlling the exhaust just reaches the other piston during the scavenging period and there is turned to return to the exhaust port.

To reach the highest speeds possible the stroke of each piston should preferably be smaller than the stroke of a comparable piston in a single piston type of two cycle combustion engine of equal piston displacement. The combined total stroke of the two pistons may if desired be similar to or even greater than stroke customary with opposed piston engines, particularly when the construction employed provides a plurality of scavenging ports and a plurality of exhaust ports in rows around the cylinder with the row of exhaust ports further inside the cylinder than the row of scavenging ports.

In an engine employing the diesel principle, both crank cases may be employed to deliver pure air to the cylinder, while in the case of an engine employing the Otto principle, both crank cases may handle a combustible charge such as a mixture of air and fuel for delivery to the cylinder. With the present invention, the crank case adjoining the piston controlling exhaust can scavenge and charge the cylinder with clean air while the other crank case can supply a combustible charge to the cylinder. It is, of course, possible to inject fuel separately into the cylinder or into the charging air ports, as circumstances require.

It is a characteristic of the engine provided by this invention that one end portion of the cylinder has both exhaust and intake ports controlled by one piston, and that this piston be contacted and effectively cooled by the scavenging flow which, in a typical situation, may be pure air. To increase the effect of the action some or all of the scavenging ports may be disposed to direct the scavenging flow into the cylinder at an angle or they can be such as to direct the scavenging flow against the top of the piston controlling the exhaust, it being apparent that the top of the piston may be flat, concave, convex, or shaped in a manner to best control the direct flow. In some instances the top of the piston can be crowned and guiding surfaces or elements may be provided thereon or incorporated in connection therewith after the fashion common to engine construction of this general character.

The quantity of charging air introduced into the cylinder at the end remote from the exhaust can be prevented from partial escape through the exhaust port or ports if the air inlet ports enter the cylinder to introduce the air in a direction transverse of the cylinder. In practice the air or charge can be advantageously introduced tangentially to impart a rotary motion to the air or charge in the cylinder, and it will be apparent that the air or combustible charge can be introduced in a plane normal to the axis of the cylinder or in a direction pitched or inclined relative to that plane, as circumstances may require.

The various objects and features of my invention will be fully understood from the following detailed description of typical preferred forms and applications of the invention, throughout which description reference is made to the accompanying drawings, in which:

Fig. 1 is a longitudinal or vertical detailed sectional view of an engine unit embodying the present invention. Fig. 2 is a transverse sectional view taken as indicated by line 2—2 on Fig. 1. Fig. 3 is a transverse sectional view taken as indicated by line 3—3 on Fig. 1. Fig. 4 is a view similar to Fig. 2 showing a modified construction. Fig. 5 is a view similar to Fig. 3 showing a modified construction. Fig. 6 is a detailed sectional view of an engine unit similar to that illustrated in Fig. 1 except that it is a unit of a flat horizontally disposed multiple cylinder engine. Fig. 7 is a plan view of the engine showing a three cylinder construction, parts being broken away to show in section. Fig. 8 is a plan section of a two cylinder engine wherein the cylinders are one above the other, and showing part of the unit in section. Fig. 9 is a vertical section of the engine shown in Fig. 8. Fig. 10 is a diagrammatic view illustrating a combining of the cylinder unit arrangements illustrated in Figs. 7 and 9 of the drawings.

As will be apparent from the drawings, the present invention can be incorporated in engines involving one or more cylinder units and these units can be arranged in various manners. For purpose of example, references will be made first to the form of construction illustrated in Figs. 1, 2 and 3 of the drawings where a cylinder unit is shown vertically disposed. It is to be understood that such a unit can be arranged or disposed in any desired manner as circumstances require.

The structure shown in Figs. 1, 2 and 3 involves, generally, a cylinder A which can be considered as divided generally into a middle or central portion 10 and two end portions, one of which may be referred to as the charging end portion 11 and the other the exhaust end portion 12. Like or similar pistons are oppositely disposed in the cylinder A and it may be considered that the piston operating mainly in the charging end 11 of the cylinder is a charging piston B while the piston operating in the exhaust end portion 12 of the cylinder is an exhaust and charging piston C. It is to be understood, of course, that both pistons are working pistons, that is, they are driven in the cylinder by the combustion that occurs in the cylinder.

A crank case D is provided on or is coupled to the charging end 11 of cylinder A and carries a crank shaft 15 coupled to the piston B by a connecting rod 16.

A crank case E is provided or is coupled to the exhaust end portion 12 of cylinder A and carries a crank shaft 17 coupled to piston C by a connecting rod 18.

It will be apparent that the connecting rods can be connected to the pistons by wrist pins 19, and the general elements just referred to can, in practice, be constructed in accordance with practice followed generally in the manufacture of engines of this general type.

In accordance with the present invention, one or more inlet ports 20 are provided in the charging end portion 11 of cylinder A and these ports are located generally so that when the piston B is extended or approaches the center of the cylinder it uncovers the ports 20 admitting charging air or fuel mixture to the chamber X established by the case D. As the piston B moves outward from the extended or central position or upwardly in the case illustrated in Fig. 1, ports 20 are closed and the charge admitted to chamber X is compressed.

The invention provides one or more sets of transfer or charging ports controlled by piston B and in the case illustrated each set of charging ports involves transfer or receiving ports 21 in the cylinder portion 11 and delivering ports 22 in the cylinder portion 11. The ports 21 and 22 are connected by a manifold 23 that establishes a passageway 24 extending lengthwise of cylinder portion 11. The delivering ports 22 are located axially in the cylinder A so that when the piston B is in the retracted position or is at the outer portion of its stroke the head 30 of piston B uncovers the ports 22. The receiving ports 21 are located so that when the piston B is in the position just mentioned ports 31 in the skirt 32 of piston B registers with the receiving ports 21 providing communication between the chamber X and the interior of the cylinder A through passageway 24 so that free flow of a charge compressed in chamber X occurs through the ports 31 and 21, the passageway 24 and the ports 22 into the cylinder ahead of piston B as clearly indicated by the arrows in Fig. 1.

In the case illustrated in Fig. 3, a single annular manifold 23 surrounds the inner end portion 11 of the cylinder A and couples the several receiving ports 21 with the several delivery ports 22. In the case illustrated in Fig. 5 there are individual manifolds 23ª, one connecting each port 21 with its related port 22.

In accordance with the broader principles of the invention, it is contemplated that the delivery ports 22 be in a row or series extending circumferentially of the cylinder, and it is contemplated that they be of such circumferential extent, of such number, and so spaced from each other as to provide the desired flow in the manner just described.

Further, it is contemplated that the delivery ports be pitched or fashioned, if desired, to cause the charge delivered thereby to enter the cylinder most advantageously. In the case illustrated in Fig. 3 and as shown in Fig. 5, the delivery ports are pitched so that the charge delivered thereby into the cylinder enters the cylinder in a transverse plane normal to the longitudinal axis of the cylinder and also tangentially of the cylinder creating a whirling or circular flow into the cylinder.

At the exhaust end portion 12 of the cylinder, the invention provides one or more inlet ports 40 located in the cylinder so that when piston C is fully extended or approaches the center of the cylinder A, it uncovers the port or ports 40 allowing free flow of scavenging fluid into the chamber Y established by the case E. As the piston C moves out from the center position, port or ports 40 are closed by the piston C and the scavenging fluid in chamber Y is compressed.

The invention provides one or more sets of transfer or scavenging ports at the exhaust end portion 12 of the cylinder A, and in the case illustrated, each set of scavenging ports involves a receiving port 45 and a delivering port 46.

The port or ports 46 are located longitudinally of the cylinder so that when the piston C is out or at the retracted end portion of its stroke the port or ports 46 are uncovered. The port or ports 45 are located so that when port or ports 46 are uncovered a port or ports 47 in the skirt 48 of piston C registers with the port or ports 45.

A manifold 49 is provided establishing a passageway 50 between related ports 45 and 46 so that when the piston is in position as just described and as shown in Fig. 1, there is free flow from the chamber Y into the cylinder A immediately above the head 51 of piston C.

In accordance with the invention one or more exhaust ports 55 are provided in the cylinder and the exhaust port or ports are located so that when the piston C is retracted or at the outer end portion of its stroke the exhaust ports 55 open first and then the port or ports 45 and 46 are uncovered, as clearly shown in Fig. 1 of the drawings.

In the case of the construction illustrated in Fig. 2 there are several sets of transfer ports at the exhaust end portion 12 of cylinder A and there is a group of such ports at one side of the cylinder diametrically opposite exhaust ports 55. As a result of this relationship, the flow from chamber Y entering the cylinder passes upwardly, as indicated by the arrows in Fig. 1, is directed by the shape of the ports and then flows upwardly and around and then finally downwardly discharging through ports 55.

In the case illustrated in Fig. 4, the relationship just described is provided, except that a set of transfer ports is located between the exhaust ports 55 resulting in introduction of flow from chamber Y at the side of the cylinder where exhaust occurs as well as at the side of the cylinder diametrically that where the exhaust occurs.

In the case illustrated in Figs. 1 and 2 there is one set of ports 45 and 46, as above described, directly opposite the exhaust ports and at each side of this set and adjacent thereto there is a port 46a in the cylinder wall connecting with the chamber Y through a passage 50a provided by a manifold 49a. The single port 46 opens up and into the cylinder directly opposite the exhaust side of the cylinder, whereas the ports 46a open up and toward the port 46, with the result that there is a desired stream or flow directed upwardly in or longitudinally of the cylinder at one side thereof.

In carrying out the present invention so that the engine operates on the diesel principle, air may be admitted to each of the chambers X and Y as hereinabove described, and the fuel may be introduced at the center of the cylinder by means of a suitable injector J, with or without assistance of pre-combustion chambers, turbulence chambers, energy cells, etc.

If the engine is to operate in accordance with the Otto principle, carburetion occurs or is provided and in a typical situation carburetors can be provided so that the air entering the ports 20 carries fuel, and as a result a charge is compressed in chamber X and is finally transferred to the cylinder A for final compression in cylinder A. In such an event, the unit at J, instead of being an injector is a spark plug or spark generating device serving to ignite the charge in the cylinder A. It is, of course, contemplated that within the broader principles of the invention where the Otto principle is carried out, fuel can be mixed with the air at any point for final compression or also injected separately directly into the cylinder.

In practice, the cranks operating the pistons are related to the ports so that the pistons effect the desired opening and closing of the ports. In a typical situation the exhaust ports 55 are controlled by piston C so that they open when the crank of shaft 17 is at an angle such as is designed at $E^1$ and are closed when the crank is at an angle such as is indicated at $E^2$. The ports 45 and 46 handling the scavenging air may be opened when the crank of shaft 17 is at an angle $S^1$ and may be closed when that crank is at angle $S^2$. The piston B controlling the charging ports 21 and 22 may open those ports when the crank of shaft 15 is at angle $C^1$ and and may close those ports when that crank is at angle $C^2$.

The crank shafts can in practice be coupled in various manners to synchronize its action or operation and they are preferably so timed or related that the charging ports are open only while the scavenging ports are open. The displacement angle or lead incorporated in the engine may be small as the charging ports can be distributed around the cylinder end portion 11 and consequently formed so that they are of limited extent lengthwise of the cylinder.

The engine construction of the present invention can produce or develop high mean effective pressure at speeds not obtainable with ordinary single-piston two cycle engines or with ordinary opposed piston two cycle engines constructed to have uniflow scavenging. The clean air introduced to scavenge the cylinder and introduced to carry out the counterflow method and the consequent charging with a fuel bearing mixture, where the Otto cycle is carried out, minimizes fuel losses and results in high over-all efficiency.

To gain the desired mass balance, it is preferred to relate the rotative positions of the crank shafts so that these shafts turn in opposite directions. However, it is contemplated that the invention may be carried out in a structure wherein the cranks are related to turn in the same direction. In carrying out the invention, it is generally preferred that the crank shafts be connected by gearing or by chain or shaft drives or connecting links to the end that the power developed is delivered to a common drive shaft.

In accordance with the present invention cylinder units embodying the structure of the invention, and as shown in Fig. 1, can be incorporated into multiple cylinder engines in various ways. In Figs. 6 and 7 there is illustrated a construction wherein a plurality of cylinder units are horizontally disposed and are in side by side relation. The several cylinders adjoin each other in a unitary cylinder block and in the particular case illustrated there are three cylinder units incorporated in the engine.

In this case there are two crank shafts, each having a crank for each cylinder unit and the crank shafts project into a housing 60 at one end of the block of cylinders. A drive or power delivering shaft 61 is carried by the block and housing construction and projects from the housing 60. In practice the power developed by the engine can be taken from the shaft 61 in any suitable manner.

In the case illustrated the two crank shafts of the engine are coupled with the drive shaft 61 so that they operate in opposite directions. In the particular case illustrated a drive sprocket 62 is provided on one crank shaft and operates a chain 63 that drives a sprocket 64 on the drive shaft 61. The other crank shaft operates a drive sprocket 65 that operates a chain 66 driving a sprocket 67 on a countershaft 68. The countershaft carries a drive gear 70 meshing with a gear 71 on the drive shaft 61.

Through a drive such as is shown in Fig. 7 the two crank shafts are properly related or synchronized in action and it will be apparent that by suitably relating or proportioning the parts involved in the drive the drive shaft 61 can be operated at a speed the same as or different from that at which the crank shafts operate as circumstances require.

In carrying out the invention various accessories or units of auxiliary equipment can be suitably coupled to and driven by parts of the engine, as for instance by either or both ends of each crank shaft, or by the countershaft 68. In Fig. 7 of the drawings an accessory or unit of auxiliary equipment is indicated at 72 and is shown as driven by one of the crank shafts, while another unit 73 is connected to and driven by the other crank shaft. A third unit, 74, is connected to and driven by the countershaft 68. It is to be understood that in practice units such as 72, 73 and 74 can be in the nature of fuel pumps, oil pumps, generators, starting motors, water pumps, fans, etc.

It is to be recognized that a horizontally disposed engine of flat construction, such as is shown in Figs. 6 and 7, is advantageous in many situations, for instance, it can be used to advantage in automobiles or trunks, in rail cars and like situations where it can be located beneath flooring, or it can be incorporated in aircraft as, for instance, a wing power plant, or it can be employed for stationary, portable, or general power supply. Further, such engine can be used to advantage in marine installations.

As indicated above, the present invention contemplates operation or carrying out of the diesel principle and in such case, if desired, the central portion of the cylinder of each cylinder unit can be extended, as indicated at 80 in Fig. 6, to provide an extension of the cylinder space, and in general the engine can be operated either by direct injection, pre-combustion, with a turbulence chamber, on the energy or air cell principle, etc. to suit various fuels, services, and operating conditions.

In the form of the invention illustrated in Figs. 8 and 9 of the drawings, cylinder units are shown in a multiple cylinder engine and in stacked relation, or so that there is one cylinder unit above another. In the case of a multiple cylinder engine the stacking, as shown in Figs. 8 and 9, can be used as shown in those figures, or can be combined with a horizontal series arrangement as shown in Figs. 6 and 7, so that a substantial number of cylinder units is incorporated in a single, compact assembly or block.

In Figs. 8 and 9, the crank shafts 15ª and 17ª of the cylinder units are coupled, as by drive means included in a housing 60ª, so that the several cranks involved are coupled to operate synchronously. As indicated in Fig. 8, the cranks related to one cylinder unit are coupled to the drive shaft 61ª by gearing. A drive gear 62ª on one shaft meshes with and drives a gear 64ª on the power shaft 61ª. A drive gear 65ª on the other shaft meshes with and drives a gear 67ª on a countershaft 68ª and the gear 67ª meshes with and drives the gear 64ª. In a situation of this kind there can be but one power shaft 61ª or there can be several power shafts, and if there is one power shaft it will be apparent that it can be driven from the cranks of the several cylinder units involved in the engine through gearing or drives of the type illustrated in Figs. 7 and 8 of the drawings. In the case of drive connections from the crank shafts to the power delivery shaft or between the crank shafts as indicated in the drawings the gears, countershafts or other elements involved may be located, offset or disposed as conditions require so that the working parts do not interfere with each other. In a case such as is shown in Figs. 8 and 9, gears such as 67ª occurring adjacent each other can be engaged or meshed so the two units are coupled.

In the case of an arrangement of cylinder units such as is shown in Figs. 8 and 9, where these units are one above the other, it is preferred to dispose the ports so that ports of one cylinder unit open upwardly while those of the other unit open downwardly. Further, it will be obvious from the drawings that the cylinder units in this form of the invention, as in other forms of the invention, can be equipped with suitable air filters, manifolds, carburetors, and other such equipment, common to engines, as circumstances may require.

In carrying out the invention in the manner illustrated in Figs. 8 and 9 of the drawings and where there are two cylinder units, these units are preferably geared together or related so that their cranks are, in effect, 180° apart, as shown in Fig. 9 of the drawings. It will be understood, of course, that in a situation such as is shown in Figs. 6 and 7, the crank arms on the individual cranks can be angularly related, depending upon the relationship desired between the cylinder units and depending upon the number of cylinder units incorporated in the engine.

It is further to be observed from the drawings, and particularly from Figs. 7 and 9 of the drawings, that where the invention is incorporated in an engine involving more than one cylinder unit, the crank cases defining the chambers where compression occurs are separate, or separated.

Furthermore, it will be apparent from Figs. 6 and 7 of the drawings that the invention can be carried out in an engine wherein a jacket 90 is provided in connection with the cylinder unit or units involved, which jacket is designed to carry a coolant. In another situation such as is shown in Figs. 8 and 9, the engine may be designed for air cooling, in which case radiating fins 91 may be provided on the cylinder units and suitable provision may be made for inducing circulation of air to the cylinder units. In the case illustrated a jacket or housing 92 is provided adjacent the cylinder unit or units to be cooled, and one or more of the available shafts, for instance, one or more of the crank shafts, may be provided with blowers or fans 93 so that air is circulated in the manner indicated in Fig. 8.

It is to be recognized from the foregoing description and from the drawings that with the construction provided the power delivering shaft or shafts can be operated in any desired direction relative to the crank shafts, or to a particular crank shaft, and it will be apparent that the power delivering shaft can be operated at a speed the same as or at speeds differing from that of the crank shafts.

In the engine illustrated in Figs. 8 and 9 auxiliary units indicated at 72, 73 and 74 are driven by available shafts, and in practice such auxiliary equipment can be provided as necessary, and can be driven in any suitable manner, as circumstances require.

Furthermore, when considering the construction possible with the present invention, it will be noted that an engine construction can be provided involving a plurality of cylinder units arranged as shown in Figs. 6 and 7, or arranged as shown in Figs. 7 and 8, or combining the arrangements shown in these figures, in which case one or more of the cylinder units can be constructed to operate as a gas or air compressor. In such case the cylinder or cylinders provided for compression may have the ports or valve means provided so that the desired compressing results as the engine operates.

It is to be observed that with the crank cases related to the cylinder of each unit, these elements can be effectively and economically coupled or secured into a dependable assembly, as by tie rods 100 extending parallel with the cylinder and between the crank cases in a manner such as is illustrated in Fig. 7. In practice any desired number and arrangement of such tie rods may be provided as circumstances require. Furthermore, from the foregoing description it will be apparent that engines embodying the present invention can be supercharged, if desired.

It is to be understood that in the various cases of employing structures such as are illustrated on Sheets 2 and 3 of the drawings, parting of the cylinder units can be employed carrying out the principles of the invention as illustrated on Sheet 1 of the drawings.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A two cycle internal combustion engine comprising a cylinder, a closed crank case at each end of said cylinder, a crankshaft rotatably mounted in each crankcase, a piston coupled to each crankshaft for reciprocation toward and away from each other within said cylinder, first inlet port means opening into said cylinder adjacent one end thereof at a position wherein said inlet port means are uncovered by one of said pistons to admit charging fluid into the crankcase at said one end when said one of said pistons is at the end portion of its stroke remote from said one end, first delivery port means controlled by said one of said pistons for delivering compressed charging fluid from said last mentioned crankcase to the space within said cylinder between said one of said pistons and the other of said pistons when said one of said pistons is at the end portion of its stroke adjacent said one end, said delivery port means being oriented to direct said compressed charging fluid into said space tangentially of said cylinder, second inlet port means opening into said cylinder adjacent the other end thereof at a position wherein said second inlet port means are uncovered by the other of said pistons to admit scavenging fluid to the crankcase at said other end when the last mentioned piston is at the end portion of its stroke remote from said other end, transfer means controlled by the last mentioned piston for delivering scavenging fluid from the last mentioned crankcase to the space within said cylinder between said pistons when said last mentioned piston is at the end portion adjacent said other end, said transfer means including a plurality of delivery ports spaced about the inner circumference of said cylinder in axial alignment with each other, said delivery ports being oriented to cooperatively direct scavenging fluid issuing therefrom axially along a restricted portion of the inner wall of said cylinder toward said one of said pistons, and exhaust port means opening into said cylinder substantially in axial alignment with said delivery ports at the opposite side of said cylinder from said restricted portion.

2. A two cycle internal combustion engine as recited in claim 1 wherein three of said delivery ports are provided, one of said delivery ports opening into said cylinder at a position diametrically opposite said exhaust ports, the other two delivery ports being located on either side of said one of said delivery ports and oriented to direct fluid issuing from said two delivery ports toward said one of said delivery ports.

3. A two cycle internal combustion engine as recited in claim 1 wherein three of said delivery ports are provided, two of said ports being located on opposite sides of said restricted portion and being oriented to discharge scavenging fluid toward each other, the third of said delivery ports being located diametrically opposite said restricted portion and oriented to discharge scavenging fluid directly toward said portion, said exhaust port means comprising a pair of ports located one on each side of said third delivery port.

References Cited in the file of this patent

UNITED STATES PATENTS

| | | |
|---|---|---|
| 898,913 | Nelson | Sept. 15, 1908 |
| 1,145,820 | Summeril | July 6, 1915 |
| 1,662,828 | Law | Mar. 20, 1928 |
| 1,910,561 | Pierce | May 23, 1933 |
| 1,986,630 | Fowler | Jan. 1, 1935 |
| 2,054,232 | Schneider et al. | Sept. 15, 1936 |
| 2,170,020 | Gerlach | Aug. 22, 1939 |
| 2,223,898 | Petersen et al. | Dec. 3, 1940 |
| 2,359,065 | Waeber | Sept. 26, 1944 |

FOREIGN PATENTS

| | | |
|---|---|---|
| 190,839 | Great Britain | Jan. 4, 1923 |
| 360,496 | Great Britain | Nov. 12, 1931 |
| 307,777 | Germany | Sept. 19, 1919 |
| 13,950 | Netherlands | Mar. 15, 1926 |
| 889,850 | Germany | Sept. 20, 1954 |